(12) United States Patent
Hauge (10) Patent No.: US 12,247,588 B2
(45) Date of Patent: Mar. 11, 2025

(54) PRESSURE EXCHANGER FOR GAS PROCESSING

(71) Applicant: ISOBARIC STRATEGIES INC., Riverside, CA (US)

(72) Inventor: Leif J. Hauge, Beaumont, CA (US)

(73) Assignee: Isobaric Strategies Inc., Riverside, CA (US)

( * ) Notice: Subject to any disclaimer, the term of this patent is extended or adjusted under 35 U.S.C. 154(b) by 357 days.

(21) Appl. No.: 17/169,738

(22) Filed: Feb. 8, 2021

(65) Prior Publication Data

US 2021/0246912 A1    Aug. 12, 2021

Related U.S. Application Data

(60) Provisional application No. 62/975,503, filed on Feb. 12, 2020.

(51) Int. Cl.
*F04F 13/00* (2009.01)
*B01D 53/14* (2006.01)
(Continued)

(52) U.S. Cl.
CPC .......... *F04F 13/00* (2013.01); *B01D 53/1425* (2013.01); *B01D 53/18* (2013.01);
(Continued)

(58) Field of Classification Search
CPC ..... B01D 53/1425; B01D 53/18; C10L 3/103; C10L 3/104; C10L 2290/541; F04B 9/00; F04F 13/00; F15B 3/00
(Continued)

(56) References Cited

U.S. PATENT DOCUMENTS 2,675,173 A    4/1954 George
2,898,866 A    8/1959 Deackoff
(Continued)

FOREIGN PATENT DOCUMENTS

CN    101440828    5/2009
CN    101568733    10/2009
(Continued)

OTHER PUBLICATIONS

Richard Stover, et al., "Permeate Recovery Rate Optimization at the Alicante Spain SWRO Plant", International Desalination Association World Congress: Dubai 2009—DB09-083, https://www.researchgate.net/publication/238733283, 12 pages.
(Continued)

*Primary Examiner* — Woody A Lee, Jr.
*Assistant Examiner* — Justin A Pruitt
(74) *Attorney, Agent, or Firm* — Fish & Richardson P.C.

(57) ABSTRACT

A pressure exchanger includes a rotor including rotor ducts extending parallel to an axis, a first end cover disposed at a first side of the rotor, and a second end cover disposed at a second side of the rotor. The rotor is configured to rotate about the axis, communicate first fluid and second fluid through the rotor ducts, control pressure of the first fluid or the second fluid discharging from the rotor, and allow a least a portion of the first fluid to contact the second end cover to thereby reduce or eliminate a dead volume inside of the rotor. The second fluid includes a flush volume that passes through the rotor ducts.

18 Claims, 6 Drawing Sheets

(51) Int. Cl.
  *B01D 53/18* (2006.01)
  *C10L 3/10* (2006.01)
  *F04B 9/00* (2006.01)
  *F15B 3/00* (2006.01)

(52) U.S. Cl.
  CPC .............. *C10L 3/103* (2013.01); *C10L 3/104* (2013.01); *F04B 9/00* (2013.01); *C10L 2290/541* (2013.01); *F15B 3/00* (2013.01)

(58) Field of Classification Search
  USPC .......................................................... 417/66
  See application file for complete search history.

(56) References Cited

U.S. PATENT DOCUMENTS

| | | | |
|---|---|---|---|
| 3,095,704 | A | 7/1963 | Brian |
| 3,145,909 | A * | 8/1964 | Gardiner ................. F04F 13/00 |
| | | | 417/64 |
| 3,234,736 | A | 2/1966 | Brian |
| 3,874,166 | A | 4/1975 | Kirchhofer et al. |
| 4,352,638 | A | 10/1982 | Vallance |
| 5,338,158 | A | 8/1994 | Hauge |
| 5,522,217 | A | 6/1996 | Zauner |
| 5,988,993 | A | 11/1999 | Hauge |
| 6,460,342 | B1 | 10/2002 | Nalim |
| 6,544,492 | B1 * | 4/2003 | DeBerry ............ B01D 53/1468 |
| | | | 423/576.2 |
| 6,725,881 | B1 | 4/2004 | Beswick et al. |
| 7,938,627 | B2 | 5/2011 | Muller |
| 7,997,853 | B2 * | 8/2011 | Pique ..................... B01D 61/10 |
| | | | 415/95 |
| 8,226,376 | B2 | 7/2012 | Krosgsgard et al. |
| 9,440,895 | B2 * | 9/2016 | Arluck .................... F04F 13/00 |
| 9,546,671 | B2 * | 1/2017 | Hirosawa ................ F04F 13/00 |
| 9,604,889 | B2 * | 3/2017 | Arluck ................... B01D 53/18 |
| 9,945,216 | B2 | 4/2018 | Ghasripoor et al. |
| 10,125,594 | B2 * | 11/2018 | Lewis ..................... E21B 43/26 |
| 10,125,796 | B2 | 11/2018 | Hauge |
| 10,138,907 | B2 | 11/2018 | Pinto et al. |
| 10,900,318 | B2 * | 1/2021 | Lewis .................... E21B 33/068 |
| 10,961,823 | B2 * | 3/2021 | Shampine ............... E21B 47/18 |
| 11,157,025 | B2 * | 10/2021 | Shampine ............... F04F 13/00 |
| 11,572,899 | B2 | 2/2023 | Hauge |
| 2006/0037895 | A1 | 2/2006 | Shumway |
| 2009/0104046 | A1 | 4/2009 | Martin et al. |
| 2010/0196152 | A1 | 8/2010 | Pique et al. |
| 2013/0037008 | A1 | 2/2013 | Takamiya |
| 2013/0121850 | A1 | 5/2013 | Pinto et al. |
| 2014/0128656 | A1 | 5/2014 | Arluck et al. |
| 2015/0096739 | A1 | 4/2015 | Ghasripoor et al. |
| 2016/0160890 | A1 | 6/2016 | Anderson |
| 2016/0222985 | A1 | 8/2016 | Oklejas, Jr. |
| 2017/0130743 | A1 | 5/2017 | Anderson |
| 2017/0335668 | A1 | 11/2017 | Ghasripoor et al. |
| 2017/0350428 | A1 | 12/2017 | Martin et al. |
| 2019/0055805 | A1 | 2/2019 | Lewis et al. |
| 2019/0278306 | A1 | 9/2019 | Shampine |
| 2019/0390576 | A1 | 12/2019 | Thatte |
| 2020/0149556 | A1 * | 5/2020 | Judge ................. E21B 43/2607 |
| 2021/0246910 | A1 | 8/2021 | Hauge |
| 2021/0254636 | A1 | 8/2021 | Hauge |

FOREIGN PATENT DOCUMENTS

| | | |
|---|---|---|
| EA | 2575 | 6/2002 |
| GB | 840408 | 7/1960 |
| JP | 2011231634 | 11/2011 |
| RU | 2659646 | 7/2018 |
| SU | 1642096 | 4/1991 |

OTHER PUBLICATIONS

International Preliminary Report on Patentability in International Appln. No. PCT/US2021/018012, dated Aug. 25, 2022, 9 pages.
International Preliminary Report on Patentability in International Appln. No. PCT/US2021/018010, dated Aug. 25, 2022, 10 pages2eswes.
International Search Report and Written Opinion in International Appln. No. PCT/US2021/018003, dated Apr. 28, 2021, 20 pages.
International Search Report and Written Opinion in International Appln. No. PCT/US2021/018010, dated May 7, 2021, 18 pages.
International Search Report and Written Opinion in International Appln. No. PCT/US2021/018012, dated Apr. 6, 2021, 14 pages.
International Preliminary Report on Patentability in International Appln. No. PCT/US2021/018003, dated Mar. 23, 2022, 5 pages.
RU Office Action in Russian Appln. No. 2022123957/12, dated Apr. 28, 2023, 15 pages (with English translation).
CN Office Action in Chinese Appln. No. 202180014563.4, dated Sep. 29, 2023, 22 pages (with English translation).

* cited by examiner

FIG. 1

RELATED ART

FIG. 2

RELATED ART

FIG. 3

RELATED ART

PRESSURE EXCHANGER FOR GAS PROCESSING

CROSS-REFERENCE TO RELATED APPLICATION

This application claims priority to U.S. Provisional Patent Application No. 62/975,503, filed on Feb. 12, 2020, the disclosures of which are incorporated herein by reference.

TECHNICAL FIELD

The present disclosure relates to a pressure exchanger, and more specifically, a pressure exchanger for gas processing that can avoid damaging air hammer by eliminating or reducing a dead volume in a rotor of the pressure exchanger and provide a flush volume to the rotor.

BACKGROUND

A pressure exchanger is a device that can exchange pressure energy between a high-pressure fluid stream and a low-pressure fluid stream. A common use for pressure exchangers is in Sea Water Reverse Osmosis (SWRO) desalination plants. The SWRO plants may operate at a pressure in a range of 60-70 bar, and in some cases, a catastrophic failure may occur due to admission of air with the low-pressure feed water. Specifically, the damage may occur when air volumes are trapped in rotor ducts of the pressure exchanger and suddenly exposed to and compressed by high-pressure water. This exposure may cause localized high pressure on the rotor ducts, which are generally made of ceramic, and break the rotor ducts. It is, therefore, important to remove air from seawater entering one or both of the high and low-pressure sides. For example, the air may be removed through a vent on the piping before pressurizing the flow.

In some cases, a pressure exchanger can be used in an absorption process such as natural gas processing. Like the pressure exchanger used in SWRO plants, the pressure exchanger can exchange pressure energy between a high pressure fluid stream and a low pressure fluid stream while separating the two fluid streams by a liquid barrier or interface formed in a rotor of the pressure exchanger. For instance, the liquid barrier or interface may be defined by a fluid volume remaining in the duct of the rotor (i.e., dead volume) of one or both of the streams. The pressure exchanger may use the remaining dead volume in the rotor as the separating interface or barrier to avoid excessive mixing of the two fluid streams in the rotor. However, in some cases, the dead volume may result in partial displacement of the fluid streams with respect to an entire duct volume, and decrease a net output of the pressure exchanger. For instance, a pressure exchanger having a 40% dead volume in the rotor may be able to use only 60% of the duct volume as a displacement volume for transmitting the streams.

A gaseous component entering the pressure exchanger may cause failures in the gas processing, as well. For example, when natural gas is processed by having sour gas absorbed in an amine solution, the separating volume (i.e., dead volume) in the rotor may be supersaturated, and some gas may strip out from the amine solution. If the stripped gas ends up on the high pressure side of the rotor, a catastrophic failure may occur due to an air hammer effect on the rotor by the compressed stripped gas.

The pressure exchanger can be used in other various applications such as absorbing $CO_2$ in seawater and pumping treated seawater toward a high pressure inlet of the pressure exchanger. In some cases, the pressure exchanger can be used for oxygenation of fish farms.

SUMMARY

The present disclosure describes a pressure exchanger for gas processing that can eliminate or reduce a dead volume in a rotor of the pressure exchanger and provide a flush volume to the rotor. For example, the present disclosure describes improved flow management techniques to achieve a complete displacement of the duct volume and supply a low pressure flush to thereby prevent or reduce stripped gas entering a high-pressure side of the rotor.

According to one aspect of the subject matter described in this application, a pressure exchanger includes a rotor configured to rotate about an axis, where the rotor defines a plurality of rotor ducts extending parallel to the axis, and each rotor duct extends between a first side and a second side of the rotor that are spaced apart from each other. The pressure exchanger further includes a first end cover that is disposed at the first side of the rotor and defines a first pair of apertures configured to communicate a first fluid having a first concentration, and a second end cover that is disposed at the second side of the rotor and defines a second pair of apertures configured to communicate a second fluid having a second concentration different from the first concentration. The rotor is configured to rotate relative to the first end cover and the second end cover, based on communicating the first fluid and the second fluid through at least a portion of the plurality of rotor ducts, exchange pressure energy between the first fluid and the second fluid, and provide at least a portion of the first fluid to the second end cover along the rotor ducts to thereby reduce or eliminate a dead volume comprising a mixture of the first fluid and the second fluid inside of the rotor.

Implementations according to this aspect can include one or more of the following features. For example, the second fluid can include a flush volume that passes through one or more of the plurality of rotor ducts from the second side to the first side of the rotor. At least one of the rotor, the first end cover, or the second end cover can change a rotation speed of the rotor to thereby control at least one of the dead volume or the flush volume. In some examples, the rotor is configured to eliminate the dead volume based on a decrease of the rotation speed or an increase of a flow rate of the second fluid entering the rotor.

In some implementations, the first pair of apertures can include a high pressure inlet configured to introduce, to the rotor, the first fluid having a first high pressure, and a low pressure outlet configured to discharge, from the rotor, the first fluid having a first low pressure less than the first high pressure. The second pair of apertures can include a low pressure inlet configured to introduce, to the rotor, the second fluid having a second low pressure, and a high pressure outlet configured to discharge, from the rotor, the second fluid having a second high pressure greater than the second low pressure. In some examples, the rotor is configured to rotate about the axis in a direction from the high pressure inlet to the low pressure outlet.

In some implementations, the first end cover can include a first sealing area that is disposed between the first pair of apertures and faces the first side of the rotor, and the second end cover can include a second sealing area that is disposed between the second pair of apertures and faces the second side of the rotor. The rotor can rotate to allow at least a portion of the first fluid to contact the second sealing area. In some examples, the rotor is configured to rotate to allow an end portion of the flush volume to extend from the low pressure inlet to the low pressure outlet.

In some implementations, an outermost rotor duct among the plurality of rotor ducts is configured to communicate the second fluid between the first end cover and the second end cover. In some examples, a center rotor duct among the plurality of rotor ducts is configured to communicate the first fluid between the first end cover and the second end cover. In some examples, a width of the low pressure inlet is greater than a width of the high pressure outlet, and a width of the low pressure outlet is greater than a width of the high pressure inlet.

According to another aspect, a pressure exchanger includes a rotor configured to rotate about an axis, where the rotor defines a plurality of rotor ducts extending parallel to the axis, and each rotor duct extends between a first side and a second side of the rotor that are spaced apart from each other. The pressure exchanger further includes a first end cover disposed at the first side of the rotor and a second end cover disposed at the second side of the rotor. The first end cover defines a first inlet configured to receive a first fluid having a first concentration, and a second inlet configured to receive a second fluid having a second concentration different from the first concentration. The second end cover defines a first outlet that faces the second inlet and is configured to discharge the first fluid, and a second outlet that faces the first inlet and is configured to discharge the second fluid. The rotor is configured to rotate relative to the first end cover and the second end cover, based on communicating the first fluid and the second fluid through at least a portion of the plurality of rotor ducts, exchange pressure energy between the first fluid and the second fluid, and provide at least a portion of the first fluid to the second end cover along the rotor ducts to thereby reduce or eliminate a dead volume comprising a mixture of the first fluid and the second fluid inside of the rotor.

Implementations according to this aspect can include one or more of the following features. For example, the second fluid can include a flush volume that passes through one or more of the plurality of rotor ducts from the first side to the second side of the rotor, and at least one of the rotor, the first end cover, or the second end cover is configured to change a rotation speed of the rotor to thereby control at least one of the dead volume or the flush volume. In some examples, the rotor is configured to eliminate the dead volume based on a decrease of the rotation speed or an increase of a flow rate of the second fluid entering the rotor.

In some implementations, the first inlet can be a high pressure inlet configured to introduce, to the rotor, the first fluid having a first high pressure, and the first outlet can be a low pressure outlet configured to discharge, from the rotor, the first fluid having a first low pressure less than the first high pressure. The second inlet can be a low pressure inlet configured to introduce, to the rotor, the second fluid having a second low pressure, and the second outlet can be a high pressure outlet configured to discharge, from the rotor, the second fluid having a second high pressure greater than the second low pressure.

According to another aspect, a system for sour gas processing includes a contactor that defines a gas inlet configured to receive untreated gas having a first concentration level, a gas outlet configured to discharge treated gas having a second concentration level less than the first concentration level, a liquid outlet configured to discharge a first fluid having a first concentration, and a liquid inlet configured to receive a second fluid having a second concentration less than the first concentration. The contactor is configured to generate the treated gas and the first fluid based on contact between the untreated gas and the second fluid. The system further includes a tank configured to store the second fluid and to discharge the second fluid, and a pressure exchanger disposed between the tank and the contactor and configured to receive the first fluid from the contactor and the second fluid from the tank. The pressure exchanger includes a rotor configured to rotate about an axis, where the rotor defines a plurality of rotor ducts extending parallel to the axis, and each rotor duct extends between a first side and a second side of the rotor that are spaced apart from each other. The pressure exchanger further includes a first end cover that is disposed at the first side of the rotor and defines a first pair of apertures configured to communicate one or both of the first fluid and the second fluid, and a second end cover that is disposed at the second side of the rotor and defines a second pair of apertures configured to communicate one or both of the first fluid and the second fluid. The rotor is configured to rotate relative to the first end cover and the second end cover, based on communicating the first fluid and the second fluid through at least a portion of the plurality of rotor ducts, exchange pressure energy between the first fluid and the second fluid, and provide a least a portion of the first fluid to the second end cover along the rotor ducts to thereby reduce or eliminate a dead volume comprising a mixture of the first fluid and the second fluid inside of the rotor. The second fluid can include a flush volume that passes through one or more of the plurality of rotor ducts between one of the first pair of apertures and one of the second pair of apertures.

Implementations according to this aspect can include one or more of the following features. For example, the system can further include a regenerator including a reservoir configured to receive the first fluid from the pressure exchanger, where the regenerator is configured to generate the second fluid from the first fluid and supply the second fluid to the tank. In some examples, the tank is disposed at a higher level relative to the pressure exchanger with respect to a ground. In some implementations, the system can further include a pump disposed between the regenerator and the tank and configured to supply the second fluid from the regenerator to the tank. In addition, the pressure exchanger of the system can include the features of the pressure exchangers described above.

BRIEF DESCRIPTION OF THE DRAWINGS

Like reference symbols in the various drawings indicate like elements.

DETAILED DESCRIPTION

One or more implementations of the present disclosure will be described below. These described implementations are only exemplary of the present disclosure. As discussed in detail below, the described implementations relate generally to natural gas processing, and particularly to an amine gas processing plant that processes natural gas using water-based amine solutions.

The present disclosure describes one or more examples of a pressure exchanger for gas processing that can eliminate or reduce a dead volume in a rotor of the pressure exchanger and provide a flush volume to the rotor. The present disclosure also describes a system for gas processing including a pressure exchanger.

In some implementations, the pressure exchanger can be used for amine gas processing and help to prevent gas (e.g., $CO_2$, $H_2S$, etc.) stripped from supersaturated amine solution from entering the high-pressure side. The pressure exchanger can mitigate risk of damage to the pressure exchanger (e.g., the rotor) due to an air hammer effect of pressurized gas. Specifically, the present disclosure describes one or more modes of operation to provide a complete displacement of the duct volume and to supply an additional flush volume through the rotor of the pressure exchanger. In some implementations, the rotor can operate without any dead volume separating each process stream.

In some implementations, a lean amine stream can be fed to the pressure exchanger by gravity from an elevated tank. For example, the tank may be located at a position vertically higher than the pressure exchanger with respect to a ground level. In some examples, the system can include a feed pump connected in series with the tank and configured to provide continued flow to the tank. In some examples, the tank may be located at an elevated position relative to the pressure exchanger to provide continued flow to the pressure exchanger and to secure time to disengage a high pressure circulation pump (e.g., a booster pump for rich amine transfer) from the system before any stripped gas reaches rotor ducts of the pressure exchanger and causes air-hammer.

In some implementations, in order to avoid needing a very high elevation of the tank, the pressure exchanger may include low-pressure ports (e.g., ducts, pipes) that have substantially larger widths than those of the high-pressure ports. The large widths may also help to reduce a pressure drop ("dP") or energy loss across the low-pressure ports.

Figure 1:
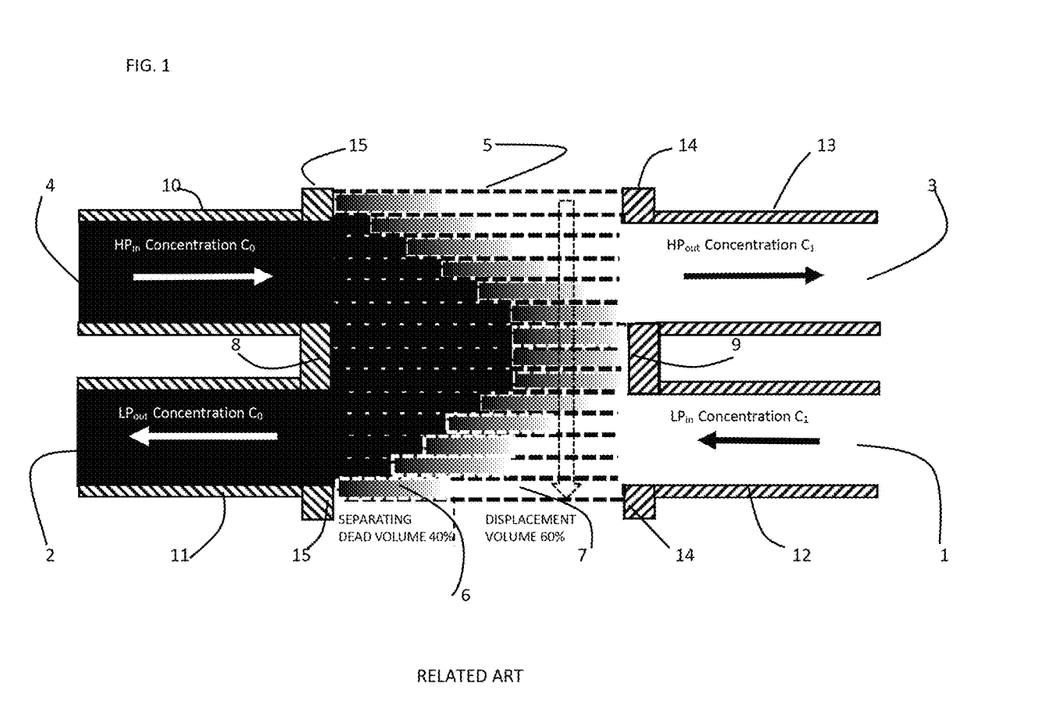
FIG. 1 is a circular cross-sectional view showing an example of a pressure exchanger in related art.

FIG. 1 is a circular cross-sectional view showing an example of operation of a pressure exchanger in related art used as an energy recovery device (ERD) in commercial SWRO.

For instance, the pressure exchanger includes a rotor 5 located between a pair of end covers 14 and 15 that face high-pressure streams and low-pressure streams. The end covers 14 and 15 may include sealing areas 8 and 9 that are disposed at central areas of the end covers, respectively. In addition, outer portions of the end covers 14 and 15 may also correspond to the sealing areas. The rotor 5 may include multiple rotor ducts that extend through an inside of the rotor 5. The rotor 5 may be located between the high-pressure and low-pressure streams and configured to rotate about an axis passing through the sealing areas 8 and 9.

The end cover 14 may define a plurality of apertures connected to an inlet duct 12 and an outlet duct 13. For example, the end cover 14 includes a first aperture connected to the inlet duct 12 and configured to receive a low pressure seawater feed 1 having $C_1$ salinity (i.e., concentration of salt), and a second aperture connected to the outlet duct 13 and configured to discharge a high pressure seawater output 3 having $C_1$ salinity.

The end cover 15 may define a plurality of apertures connected to an inlet duct 10 and an outlet duct 11. For example, the end cover 15 includes a first aperture connected to the inlet duct 10 and configured to receive a high pressure brine feed 4 having $C_0$ salinity, and a second aperture connected to the outlet duct 11 and configured to discharge a low pressure brine water output 2 having $C_0$ salinity. The salinity ($C_0$) of the brine water feed 4 may be greater than the salinity ($C_1$) of the seawater feed 1.

The seawater feed 1 may, while moving in a direction from the sealing area 9 toward the end cover 15, gradually move a dead volume 6 in the rotor 5 toward the end cover 15. For example, the dead volume 6 may constitute about 40% of an overall duct volume of the rotor 5 and remain in the rotor 5. Based on rotation of the rotor 5, the dead volume 6 may, while moving toward the end cover 15, displace the brine volume 7 in the rotor 5 through the low pressure outlet duct 11. The displacement volume may constitute about 60% of the overall duct volume.

As shown in FIG. 1, the dead volume 6 may separate the different streams and remain in the rotor ducts, while oscillating back and forth along the axis of the rotor 5 for each revolution of the rotor 5. For example, the dead volume may separate the seawater feed 1 and the brine water output 2, and separate the brine water feed 4 and seawater output 3. The dead volume 6 may define a salinity gradient having salinity $C_0$ at the brine interface of the dead volume and salinity $C_1$ at the seawater interface of the dead volume. For example, FIG. 1 illustrates a plurality of portions of the dead volume 6 in the rotor ducts in gray scale. The dead volume 6 may secure a low mixing transfer between brine water and seawater.

Figure 2:
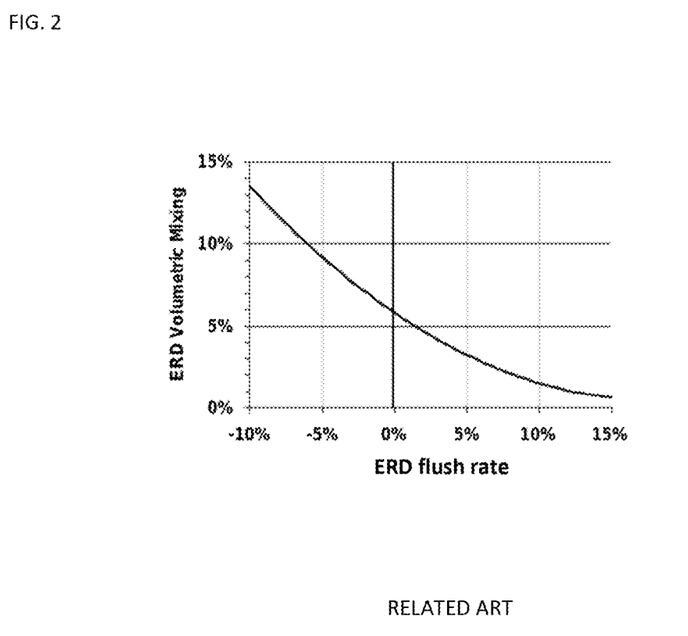
FIG. 2 shows an example of a mixing volume versus a low-pressure flush of a pressure exchanger in related art.

FIG. 2 is a graph showing an example of a relationship between a mixing volume and a low pressure flush in a pressure exchanger in related art. For example, in a balanced flow management, where a flow rate of the input seawater feed 1 (see FIG. 1) is equal to a flow rate of the high pressure seawater output 3, the ERD flush rate corresponds to 0% in FIG. 2. In the balanced flow management, there may be about 6% of volumetric mixing between the input seawater feed 1 and brine water feed 4 in the rotor 5.

In a positive ERD flush rate, the flow rate of the input seawater feed 1 is greater than the flow rate of the high pressure seawater output 3. Thus, at least some of the excessive seawater feed 1 may be output through the low pressure outlet duct 11, and thus reduce the salinity of the brine water output 2. By contrast, in a negative ERD flush rate, the flow rate of the input brine water feed 4 is greater than the flow rate of the low pressure brine water output 2. Thus, at least some of the excessive brine water feed 4 may be output through the high pressure outlet duct 13, and thus increase the salinity of the high pressure seawater output 3.

In some examples, based on the mixing curve in FIG. 2, the mixing volume in the rotor 5 may be decreased by applying an appropriate level of low pressure flush (e.g., increasing a flow rate of seawater feed 1). However, as the flow rate of the low pressure feed (e.g., seawater feed 1) increases, the cost of pretreatment may increase as well. Thus, the appropriate level of low pressure flush may be less than or equal to 5% to be cost effective.

Figure 3:
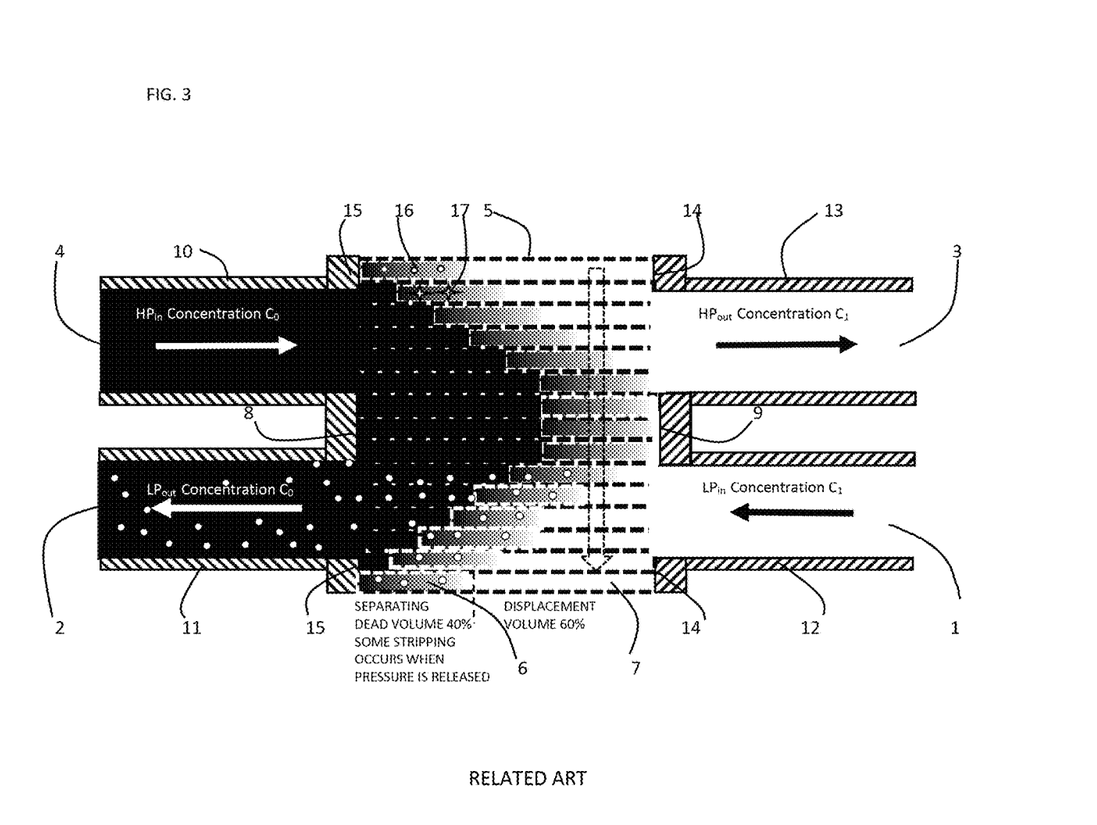
FIG. 3 is a circular cross-sectional view showing an example of a pressure exchanger for natural gas processing in related art.

FIG. 3 is a circular cross-sectional view showing an example of operation of a pressure exchanger for natural gas processing in related art. For example, the pressure exchanger described above with respect to FIG. 1 for SWRO may be used for natural gas processing. In this example, the low pressure inlet duct 12 may receive a lean amine stream 1 having a gas concentration $C_1$ (equivalent to seawater feed 1 in FIG. 1), and the high pressure outlet duct 13 may discharge the lean amine stream output 3. The high pressure inlet duct 10 may receive a rich amine stream 4 having a gas concentration $C_0$ (equivalent to brine water feed 4 in FIG. 1), and the low pressure outlet duct 11 may discharge the rich amine stream 2. The concentration $C_0$ may be greater than the concentration $C_1$. In gas processing, the concentration $C_0$ and $C_1$ may represent weight ratios of corrosive or unwanted gases absorbed in the liquid stream.

The high pressure rich amine stream 4 may be depressurized through the pressure exchanger and exchange pressure energy with the lean amine stream 1. In this process, some of gas included in the rich amine stream 4 may be striped (e.g., outgas) within the dead volume of the rotor ducts immediately after the pressure is released. As explained above with FIG. 1, the dead volume 6 remains in the rotor ducts and reciprocates between the high and low pressure stream sides (e.g., end covers 14 and 15). For example, the dead volume 6 may occupy about 40% of the duct volume of the rotor 5.

The stripped gas 16 may be an obstacle to successful use of the pressure exchanger for natural gas processing. Specifically, the stripped gas 16 may suddenly decrease its volume or shrink into the high pressure rich amine stream 4 to cause an air hammer 17 on the rotor 5 that rotates from the low pressure sides (e.g., pipe or duct 11) to the high pressure sides (e.g., pipe or duct 10). The air hammer 17 may cause impact or shock on walls of the rotor ducts of the rotor 5, which can break the pressure exchanger or reduce lifetime of the pressure exchanger.

In some examples, a low pressure flush of the lean amine stream 1 may be applied to reduce the mixing volume in the rotor 5 and the stripped gas 16. However, since the dead volume occupies about 40% of the duct volume in the example shown in FIG. 3, adding about 5% flush volume may still leave a substantial portion of the dead volume 6 intact. Thus, the stripped gas 16 may remain in the rotor 5 and cause an unacceptable hazard to safe operation of the pressure exchanger for gas processing due to the air hammer 17 of the stripped gas 16 entering the high pressure side.

The low pressure outlet duct 11 may carry the rich amine stream 2, which corresponds to a displacement volume that is, for example, 60% of the duct volume other than the dead volume 6 (e.g., 40% of the duct volume). The displacement volume may also include gas stripped out from the rich amine stream 2 at the low pressure side (e.g., white dots in rich amine stream 2 in FIG. 3). All or most of the stripped gas in the rich amine stream 2 is carried outside of the rotor ducts and thus does not enter the high-pressure side of the rotor 5. Thus, gas stripping in the displacement volume would not cause any air hammer effect to the pressure exchanger, while gas stripping in the dead volume 6 would cause occurrence of the air hammer 17.

Figure 4:
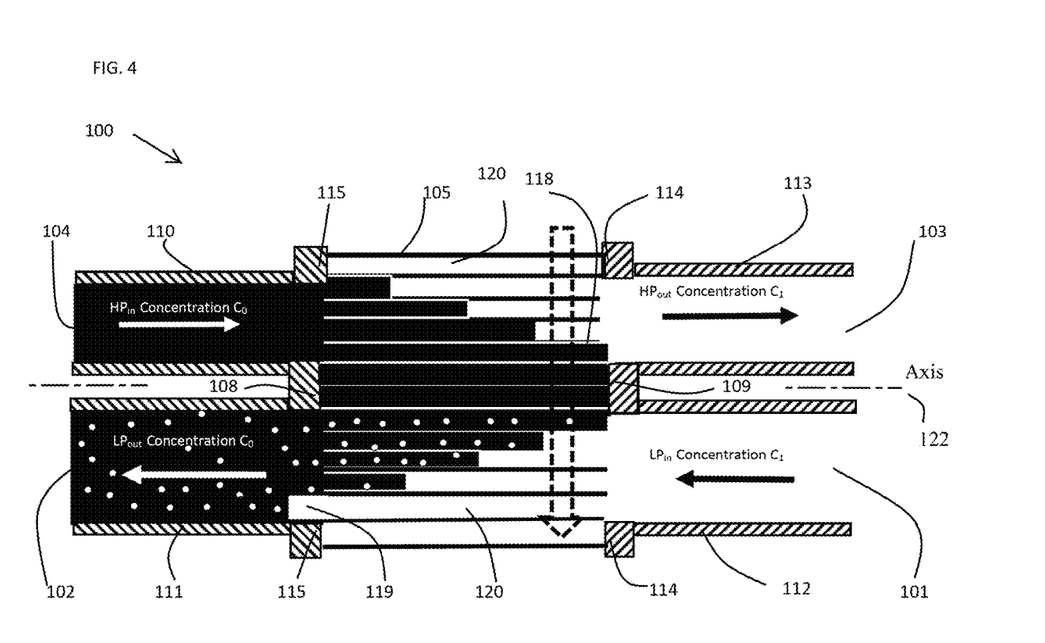
FIG. 4 is a circular cross-sectional view showing an example of a pressure exchanger and flow management for gas processing according to the present disclosure.

FIG. 4 is a circular cross-sectional view showing an example of a pressure exchanger and flow management for gas processing according to the present disclosure.

A pressure exchanger 100 can include a rotor 105 that is located between a pair of end covers 114 and 115 and that is configured to rotate about an axis 122. The rotor 105 can define a plurality of rotor ducts 120 that extend parallel to the axis 122. Each of the rotor ducts 120 extends through the rotor 105 along the axis 122 and connects between a first side facing a first end cover (e.g., the end cover 115) and a second side facing a second end cover (e.g., the end cover 114).

The rotor 105 can rotate relative to the end covers 114 and 115 by various driving mechanisms. For example, the rotor 105 may mechanically rotate about a shaft that extends along the axis 122. The shaft may be rotated by a driving device such as a motor. In some implementations, the rotor 105 (or the shaft of the rotor 105) can be configured to rotate by a flow entering to the rotor 105. For instance, the pressure exchanger 100 can further include a ramp structure that includes an inclined surface with respect to the axis 122. The inclined surface of the ramp structure can be configured to face and contact incoming flow streams (e.g., lean amine stream 101 or rich amine stream 104). Based on pressure of the incoming flow streams applied to the inclined surface of the ramp structure, the rotor 105 can rotate about the shaft relative to the end covers 114 and 115.

In some implementations, a rotation speed of the rotor 105 can be determined based on the arrangement of the incline surface of the ramp structure. For example, the rotation speed of the rotor 105 may be determined based on increasing or decreasing an inclined angle of the incline surface with respect to the axis 122. In some examples, the rotation speed of the rotor 105 may be determined based on increasing or decreasing an area or a number of the incline surfaces arranged in the ramp structure. In some examples, the rotation speed of the rotor 105 may vary based on a pattern of the inclined surface of the ramp structure.

Alternatively or in addition, the rotation speed of the rotor 105 can be controlled by adjusting a flow rate or pressure of the incoming streams. For example, the rotation speed of the rotor 105 can be increased based on an increase of the flow rate of the incoming lean amine stream 101. The rotation speed of the rotor 105 can be decreased based on a decrease of the flow rate of the incoming lean amine stream 101. In this example, the rotation speed of the rotor 105 depends on the flow rate of the incoming lean amine stream 101.

In some implementations, the rotation speed of the rotor 105 can be controlled independent of the flow rate of the incoming lean amine stream 101. For example, the rotor 105 can be rotated by a separate driving device such as a motor. In another example, one or more components of the pressure exchanger 100 may be replaced to adjust the rotation speed of the rotor 105 while keeping the same flow rate of the incoming lean amine stream 101. In particular, the end cover 114, the end cover 115, rotor 105, or the ramp structure having the inclined surface can be replaced to adjust the rotation speed of the rotor 105. In some examples, the end cover 114 and the end cover 115 may include the ramp structure having the inclined surface.

The first end cover (e.g., end cover 115) can be disposed at the first side (e.g., the left side in FIG. 4) of the rotor 105 and define a first pair of apertures configured to communicate a first fluid having a first concentration ($C_0$). For example, the end cover 115 can define a first aperture that is connected to and in communication with an inlet duct 110, and a second aperture that is connected to and in communication with an outlet duct 111. The inlet duct 110 can receive rich amine stream 104 and guide the rich amine stream 104 into the rotor 105 through the first aperture of the end cover 115. The outlet duct 111 can discharge a rich amine stream 102 from the rotor 105 through the second aperture of the end cover 115.

The end cover 115 can further include a sealing area 108 disposed at a central area of the end cover 115. For example, the axis 122 passes through the central area of the end cover 115 disposed at the sealing area 108. In addition, outer portions of the end cover 115 may also correspond to the sealing area. The outer portions of the end cover 115 may be disposed radially outward relative to the sealing area 108 and define a circumference or perimeter of the end cover 115. These sealing areas can be configured to face and block the fluid to thereby prevent or reduce leakage of the fluid from the rotor 105.

The second end cover (e.g., end cover 114) can be disposed at the second side (e.g., the right side in FIG. 4) of the rotor 105 and define a second pair of apertures configured to communicate a second fluid having a second concentration ($C_1$). For example, the end cover 114 can define a first aperture that is connected to and in communication with an inlet duct 112, and a second aperture that is connected to and in communication with an outlet duct 113. The inlet duct 112 can receive lean amine stream 101 and guide the lean amine stream 101 into the rotor 105 through the first aperture of the end cover 114. The outlet duct 113 can discharge lean amine stream 103 from the rotor 105 through the second aperture of the end cover 114.

The end cover 114 can further include a sealing area 109 disposed at a central area of the end cover 114. For example, the axis 122 passes through the central area of the end cover 114 disposed at the sealing area 109. In addition, outer portions of the end cover 114 may also correspond to the sealing area. The outer portions of the end cover 114 may be disposed radially outward relative to the sealing area 109 and define a circumference or perimeter of the end cover 114. The sealing areas can be configured to face and block the fluid to thereby prevent or reduce leakage of the fluid from the rotor 105.

In some implementations, the rotor 105 is configured to, based on communicating the rich amine stream 104 and the lean amine stream 101 through at least a portion of the plurality of rotor ducts 120, transmit pressure energy of at least one of the rich amine stream 104 or the lean amine stream 101. For example, the rotor 105 can transfer pressure energy of the high pressure rich amine stream 104 to the low pressure lean amine stream 101, and output the high pressure lean amine stream 103. In addition, the rotor 105 can output the low pressure rich amine stream 102 based on transferring the pressure energy of the high pressure rich amine stream 104 to the low pressure lean amine stream 101. That is, based on the pressure exchange, the pressure of the output lean amine stream 103 becomes greater than the pressure of the input lean amine stream 101, and the pressure of the output rich amine stream 102 becomes less than the pressure of the input rich amine stream 104.

In some implementations, as shown in FIG. 4, a flow direction of the input rich amine stream 104 may be opposite to a flow direction of the input lean amine stream 101. This implementation of the pressure exchanger 100 may be referred to as a counter flow configuration. For example, the input rich amine stream 104 may flow into the rotor 105 in a first direction (e.g., to the right direction in FIG. 4) along the axis 122, and the input lean amine stream 101 may flow into the rotor 5 in a second direction (e.g., to the left direction in FIG. 4) opposite to the first direction. The output lean amine stream 103 may flow out from the rotor in the first direction, and the output rich amine stream 102 may flow out from the rotor 105 in the second direction.

The pressure exchanger 100 can be divided into a high pressure side and a low pressure side with respect to the axis 122. For instance, the rich amine inlet duct 110 and the lean amine outlet duct 113 are located at the high pressure side, and the lean amine inlet duct 112 and the rich amine outlet duct 111 are located at the low pressure side. The high pressure side and the low pressure side are hydraulically separated from each other based on a flow management of the pressure exchanger 100. The rotor 105 can be configured to rotate about the axis 122 in a direction (e.g., the down-arrow in FIG. 4) from the high pressure inlet to the low pressure outlet.

In some implementations, the flow management, illustrated in FIG. 4, allows reduction or complete elimination of any dead volume that separates the rich amine streams 102 and 104 from the lean amine streams 101 and 103. Specifically, the high pressure rich amine stream 104 can displace the complete volume of the rotor duct 120 filled with lean amine before being closed off by the end cover sealing area 109. Unlike the examples shown in FIGS. 1 and 3, the rotor ducts 120 do not include any dead volume (e.g., the gray scale areas shown in FIGS. 1 and 3) corresponding to a mixture of lean amine and rich amine streams. That is, the rotor 105 can be configured to rotate at a predetermined speed to allow at least a portion of the rich amine stream 104 to pass through the rotor ducts 120 and contact the sealing area 109.

In some implementations, the flow management can be accomplished by adjusting one or both of the rotation speed of the rotor 105 and the flow rate of the lean amine stream 101. For example, the rotation speed of the rotor 105 may be decreased to increase the flow rate of the output lean amine stream 103 while keeping the flow rate of the input lean amine stream 101. In some examples, while the rotation speed of the rotor 105 is maintained, the flow rate of the input lean amine stream 101 can be increased to increase the flow rate of the output lean amine stream 103. In some cases, when the rotation speed of the rotor 105 may be increased, the flow rate of the input lean amine stream 101 may be also increased.

In some implementations, the rotation speed of the rotor 105 may be adjusted to allow stripped gas at the low pressure side to discharge through the outlet duct 111 rather than moving back to the high pressure side to avoid potential damage to the rotor 105 due to the air hammer effect. FIG. 4 illustrates, by way of example, stripped gas as white dots only in the low pressure side of the pressure exchanger 100 in the rotor ducts 120, and the stripped gas discharges through the low pressure outlet duct 111.

Alternatively or in addition, the flow management can utilize an addition of a flush volume of lean amine stream to avoid the air hammer effect. For example, as the rich amine stream 104 travels from the high pressure side to the low pressure side through the rotor ducts 120, the rich amine stream (e.g., rich amine in duct 118 among the rotor ducts 120) becomes supersaturated and can strip off some sour gas at the low pressure side. This supersaturated rich amine is then displaced in part or completely by a flush volume 119 of lean amine. Because the flush volume 119 of lean amine does not include any stripped gas, the flush volume 119 of lean amine may not cause the air hammer effect on the rotor 105 even though the flush volume 119 of lean amine is moved to the high pressure side based on rotation of the rotor 105.

In some implementations, as shown in FIG. 4, the rotor 105 is configured to rotate or the flow rate of the lean amine stream 101 is adjusted to allow an end portion of the flush volume 119 to extend from the low pressure inlet of the end cover 114 and pass at least a portion of the low pressure outlet of the end cover 115. In some examples, an outermost rotor duct among the rotor ducts 120 is configured to communicate the lean amine stream between the first end cover 115 and the second end cover 114. In some examples, one or more center rotor ducts among the rotor ducts 120 are configured to communicate rich amine stream between the first end cover 115 and the second end cover 114.

In some implementations, widths of the low pressure inlet duct 112 and the low pressure outlet duct 111 are configured to be greater than widths of the high pressure outlet duct 113 and the high pressure inlet duct 110. Arranging the low pressure ducts 111 and 112 with relatively large widths at the low pressure side may help to reduce a pressure drop ("dP") or energy loss. For instance, with the reduced dP, a feed tank (e.g., tank 322 in FIG. 6), which supplies the lean amine stream 101 to the pressure exchanger 100, can be installed at a modest elevation relative to the pressure exchanger 100 with respect to a ground level.

In some cases, a feed pump failure may diminish the flow through the low pressure side while the flow in the high pressure side remains unchanged. In such cases, the stripped gas may be circulated to the high pressure side by rotation of the rotor 105 and cause damage to the rotor 105 and the rotor ducts 120. The tank 232 may be disposed at an elevated level to supply the flow to the low pressure side with sufficient pressure to mitigate the risk of air hammer in case of a feed pump failure. In some implementations, the tank 322 may not be located at an excessive elevation relative to the pressure exchanger 100 based on arranging the ducts 111 and 112 having the relatively large widths at the low pressure side of the pressure exchanger 100.

Figure 5:
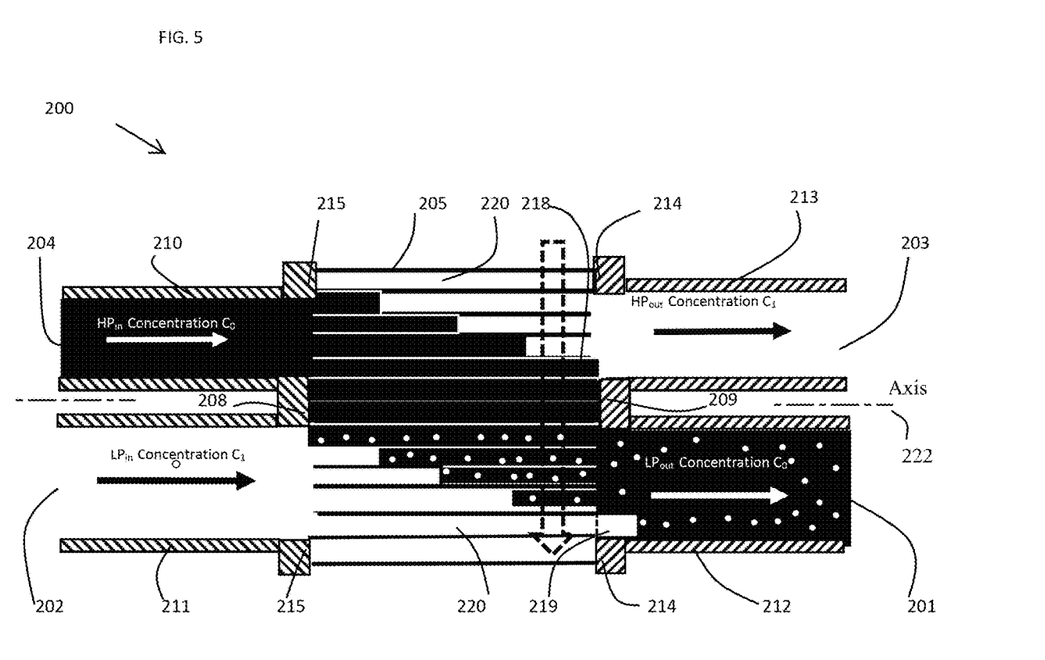
FIG. 5 is a circular cross-sectional view showing another example of a pressure exchanger and flow management for gas processing according to the present disclosure.

FIG. 5 is a circular cross-sectional view showing another example of a pressure exchanger and flow management for gas processing according to the present disclosure.

A pressure exchanger 200 can include a rotor 205 that is located between a pair of end covers 214 and 215 and that is configured to rotate about an axis 222. The rotor 205 can define a plurality of rotor ducts 220 that extend parallel to the axis 222. Each of the rotor ducts 220 extends through the rotor 205 along the axis 222 and connects between a first side facing a first end cover (e.g., the end cover 215) and a second side facing a second end cover (e.g., the end cover 214). The pressure exchanger 200 have the same or similar structure as the pressure exchanger 100 except for flow connections and directions.

The rotor 205 can rotate relative to the end covers 214 and 215 by various driving mechanisms. For example, the rotor 205 may mechanically rotate about a shaft that extends along the axis 222. The shaft may be rotated by a driving device such as a motor. In some implementations, the rotor 205 (e.g., the shaft of the rotor 205) can be configured to rotate by a flow entering to the rotor 205. For instance, the pressure exchanger 200 can further include a ramp structure that includes an inclined surface with respect to the axis 222. The inclined surface of the ramp structure can be configured to face and contact incoming flow streams (e.g., lean amine stream 202 or rich amine stream 204). Based on pressure of the incoming flow streams applied to the inclined surface of the ramp structure, the rotor 105 can rotate about the shaft relative to the end covers 214 and 215.

In some implementations, a rotation speed of the rotor 205 can be determined based on the arrangement of the incline surface of the ramp structure. For example, the rotation speed of the rotor 205 may be determined based on increasing or decreasing an inclined angle of the incline surface with respect to the axis 222. In some examples, the rotation speed of the rotor 205 may be determined based on increasing or decreasing an area or a number of the incline surfaces arranged in the ramp structure. In some examples, the rotation speed of the rotor 205 may vary based on a pattern of the inclined surface of the ramp structure.

Alternatively or in addition, the rotation speed of the rotor 205 can be controlled by adjusting a flow rate or pressure of the incoming streams. For example, the rotation speed of the rotor 205 can be increased based on an increase of the flow rate of the incoming lean amine stream 202 or rich amine stream 204. The rotation speed of the rotor 205 can be decreased based on a decrease of the flow rate of the incoming lean amine stream 202 or rich amine stream 204. In this example, the rotation speed of the rotor 205 depends on the flow rate of the incoming lean amine stream 202.

In some implementations, the rotation speed of the rotor 205 can be controlled independent of the flow rate of the incoming lean amine stream 202. For example, the rotor 205 can be rotated by a separate driving device such as a motor. In some examples, one or more components of the pressure exchanger 200 may be replaced to adjust the rotation speed of the rotor 205 while keeping the same flow rate of the incoming lean amine stream 202. In particular, the end cover 115, rotor 105, or the ramp structure having the inclined surface can be replaced to adjust the rotation speed of the rotor 205. In some examples, the end cover 115 may include the ramp structure having the inclined surface.

The first end cover (e.g., end cover 215) can be disposed at the first side (e.g., the left side in FIG. 5) of the rotor 105 and define a first inlet configured to receive a first fluid having a first concentration ($C_0$), and a second inlet configured to receive a second fluid having a second concentration ($C_1$) that is different from the first concentration. For example, the end cover 215 includes the first inlet that is connected to and in communication with an inlet duct 210, and the second inlet that is connected to and in communication with an inlet duct 211. The inlet duct 210 can receive rich amine stream 204 and guide the rich amine stream 204 into the rotor 205 through the first inlet of the end cover 215. The inlet duct 211 can receive lean amine stream 202 and guide the lean amine stream 202 to the rotor 205 through the second inlet of the end cover 215.

In some implementations, the end cover 215 can further include a sealing area 208 disposed at a central area of the end cover 215. For example, the axis 222 passes through the central area of the end cover 215 disposed at the sealing area 208. In addition, outer portions of the end cover 215 may also correspond to the sealing area. The outer portions of the end cover 215 may be disposed radially outward relative to the sealing area 208 and define a circumference or perimeter of the end cover 215. These sealing areas can be configured to face and block the fluid to thereby prevent or reduce leakage of the fluid from the rotor 205.

The second end cover (e.g., end cover 214) can be disposed at the second side (e.g., the right side in FIG. 5) of the rotor 205 and define a first outlet configured to discharge the first fluid having the first concentration ($C_0$), and a second outlet configured to discharge the second fluid having the second concentration ($C_1$). For example, the end cover 214 can include the first outlet that is connected to and in communication with an outlet duct 212, and the second outlet that is connected to and in communication with an outlet duct 213. The outlet duct 212 can discharge rich amine stream 201 and guide the rich amine stream 201 to an outside of the rotor 205 through the first outlet of the end cover 214. The outlet duct 213 can discharge lean amine stream 203 to the outside of the rotor 205 through the second outlet of the end cover 214.

In some implementations, the end cover 214 can further include a sealing area 209 disposed at a central area of the end cover 214. For example, the axis 222 passes through the central area of the end cover 214 disposed at the sealing area 209. In addition, outer portions of the end cover 214 may also correspond to the sealing area. The outer portions of the end cover 214 may be disposed radially outward relative to the sealing area 209 and define a circumference or perimeter of the end cover 214. The sealing areas can be configured to face and block the fluid to thereby prevent or reduce leakage of the fluid from the rotor 205.

In some implementations, the rotor 205 is configured to, based on communicating the rich amine stream 204 and the lean amine stream 202 through at least a portion of the plurality of rotor ducts 220, transmit pressure energy of at least one of the rich amine stream 204 or the lean amine stream 202. For example, the rotor 205 can transfer pressure energy of the high pressure rich amine stream 204 to the low pressure lean amine stream 202, and output the high pressure lean amine stream 203 through the outlet duct 213. In addition, the rotor 205 can output the low pressure rich amine stream 201 based on transferring the pressure energy of the high pressure rich amine stream 204 to the low pressure lean amine stream 202. That is, based on the pressure exchange between the streams, the pressure of the output lean amine stream 203 becomes greater than the pressure of the input lean amine stream 202, and the pressure of the output rich amine stream 201 becomes less than the pressure of the input rich amine stream 204.

In some implementations, as shown in FIG. 5, a flow direction of the input rich amine stream 204 may match or be parallel to a flow direction of the input lean amine stream 202. This implementation of the pressure exchanger 200 may be referred to as unidirectional flow configuration. For example, the input rich amine stream 204 may flow into the rotor 205 in a first direction (e.g., to the right direction in FIG. 5) along the axis 222, and the input lean amine stream 202 may also flow into the rotor 205 in the first direction. In addition, each of the output rich amine stream 201 and the output lean amine stream 203 may flow out from the rotor 205 in the first direction.

The pressure exchanger 200 can be divided into a high pressure side and a low pressure side with respect to the axis 222. For instance, the rich amine inlet duct 210 and the lean amine outlet duct 213 are located at the high pressure side, and the lean amine inlet duct 211 and the rich amine outlet duct 212 are located at the low pressure side. The high pressure side and the low pressure side can be hydraulically separated from each other based on the flow management of the pressure exchanger 200. The rotor 205 can be configured to rotate about the axis 222 in a direction (e.g., down arrow in FIG. 5) from the high pressure inlet to the low pressure outlet.

The flow management, illustrated in FIG. 5, allows reduction or complete elimination of any dead volume that separates the rich amine streams 201 and 204 from the lean amine streams 202 and 203. Specifically, the high pressure rich amine stream 204 can displace the complete volume of the rotor duct 220 filled with lean amine before being closed off by the end cover sealing area 209. Unlike the examples shown in FIGS. 1 and 3, the rotor ducts 220 do not include any dead volume (e.g., the gray scale areas shown in FIGS. 1 and 3) corresponding to a mixture of lean amine and rich amine. That is, the rotor 205 can be configured to rotate to allow at least a portion of the rich amine stream 204 to pass through the rotor ducts 220 and contact the sealing area 109. Then, the rich amine stream 201 discharges through the outlet duct 212.

In some implementations, the flow management can be accomplished by adjusting one or both of the rotation speed of the rotor 205 and the flow rate of the lean amine stream 202. For example, the rotation speed of the rotor 205 may be decreased to increase the flow rate of the output lean amine stream 203 while keeping the flow rate of the input lean amine stream 202. In some examples, while the rotation speed of the rotor 205 is maintained, the flow rate of the input lean amine stream 202 can be increased to increase the flow rate of the output lean amine stream 203. In some cases, the rotation speed of the rotor 205 and the flow rate of the input lean amine stream 202 may be increased to increase the flow rate of the output lean amine stream 203.

In some implementations, the rotation speed of the rotor 205 may be adjusted to allow stripped gas at the low pressure side to discharge through the outlet duct rather than moving back to the high pressure side to avoid potential damage to the rotor 205 due to the air hammer effect. FIG. 5 illustrates, by way of example, stripped gas as white dots only in the low pressure side of the pressure exchanger 200 in the rotor ducts 220, and the stripped gas discharges through the low pressure outlet duct 212.

Alternatively or in addition, the flow management can utilize an addition of a flush volume of lean amine stream to avoid the air hammer effect. For example, as the rich amine stream 204 travels from the high pressure side to the low pressure side through the rotor ducts 220, the rich amine stream (e.g., rich amine in duct 218 among the rotor ducts 220) becomes supersaturated and can strip off some sour gas at the low pressure side. This supersaturated rich amine is then displaced in part or completely by a flush volume 219 of lean amine. Because the flush volume 219 of lean amine does not include any stripped gas, the flush volume 219 of lean amine may not cause the air hammer effect on the rotor 205 even though the flush volume 219 of lean amine is moved to the high pressure side based on rotation of the rotor 205.

In some implementations, as shown in FIG. 5, the rotor 205 is configured to rotate to allow an end portion of the flush volume 219 to extend from the low pressure inlet of the end cover 215 and pass at least a portion of the low pressure outlet of the end cover 214. In some examples, an outermost rotor duct among the rotor ducts 220 can be configured to communicate the lean amine between the first end cover 215 and the second end cover 214. In some examples, one or more center rotor ducts among the rotor ducts 220 may be configured to communicate rich amine between the first end cover 215 and the second end cover 214.

Figure 6:
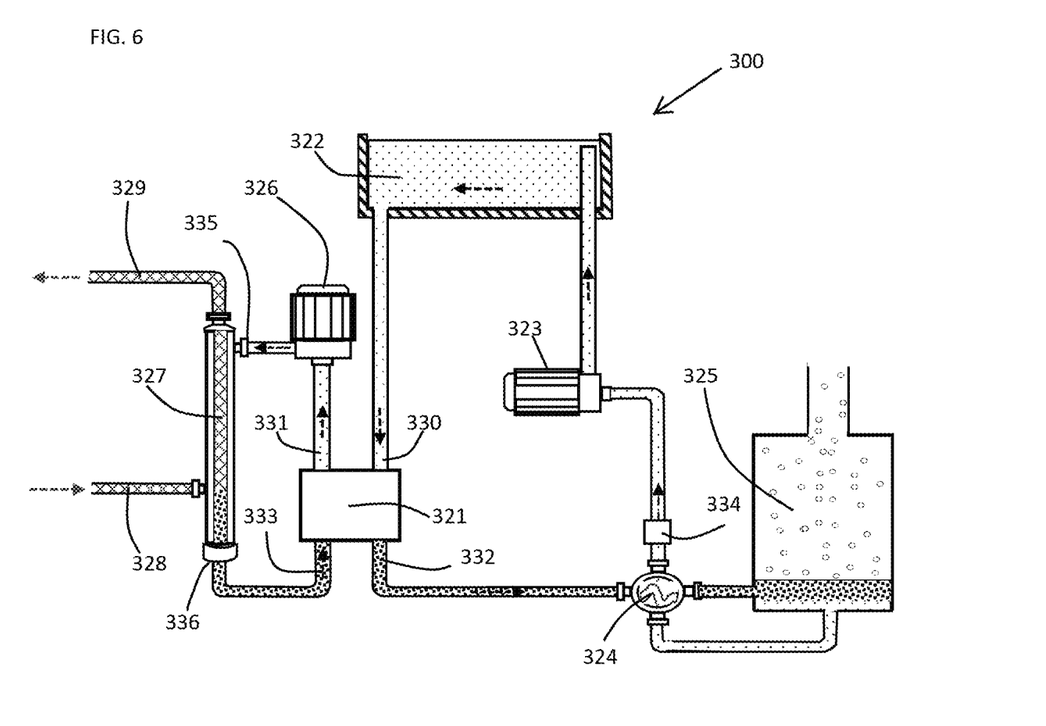
FIG. 6 is a view showing an example of a system for gas processing including a pressure exchanger according to the present disclosure.

FIG. 6 illustrates an example of a system for gas processing including a pressure exchanger according to the present disclosure.

For example, a system 300 for gas processing includes a pressure exchanger 321, a contactor 327, a gravity tank 322, and a regenerator 325. The pressure exchanger 321 is configured to receive a high pressure rich amine stream 333 from the contactor 327, and a low pressure lean amine stream 330 from the tank 322. The pressure exchanger 321 is further configured to exchange pressure energy between the high pressure rich amine stream 333 and the low pressure lean amine stream 330, and to discharge a high pressure lean amine stream 331 and a low pressure rich amine stream 332. The pressure exchanger 321 may have the same or similar structure and configuration as the pressure exchanger 100 or the pressure exchanger 200.

The contactor 327 is configured to receive the high pressure lean amine stream 331 from the pressure exchanger 321, and to receive sour gas through the gas inlet 328 from an external source. The contactor 327 is configured to, based on contact between the sour gas received through the gas inlet 328 and the high pressure lean amine stream 331 within the contactor 327, produce and discharge sweet gas through the gas outlet 329.

The system 300 further includes a plurality of pipes that connect the components of the system 300 and that are configured to carry the amine streams and gas. Accordingly, the reference numerals in FIG. 6 may refer to the pipes and ports as well as the substances (liquid or gas) carried by the pipes or ports. For example, reference number 330 may refer to the low pressure lean amine stream or the pipe or port that is connected to the pressure exchanger 321 to carry the low pressure lean amine stream to the pressure exchanger 321. In another, reference number 332 may refer to the low pressure rich amine stream or the pipe or port that is connected to the pressure exchanger 321 to carry the low pressure rich amine stream from the pressure exchanger 321.

The contactor 327 defines a gas inlet configured to receive untreated gas (e.g., sour gas including $CO_2$, $H_2S$, or any toxic gas), and a gas outlet 329 configured to discharge treated gas (e.g., sweet gas) to an outside of the contactor 327. The untreated gas may have a first toxic level or concentration, and the treated gas may have a second toxic level or concentration that is less than the first toxic level. For instance, the sour gas may have a first concentration of $CO_2$ or $H_2S$, and the sweet gas may have a second concentration of $CO_2$ or $H_2S$, where the first concentration is greater than the second concentration. The gas inlet 328 is located vertically below the gas outlet 329 such that the untreated gas rises inside the contactor 327 and contacts lean amine stream.

The contactor 327 further defines a liquid inlet 335 configured to receive the high pressure lean amine stream 331 from the pressure exchanger 321, and a liquid outlet 336 configured to discharge the high pressure rich amine stream 333 to the pressure exchanger 321. The contactor 327 is configured to, based on reaction between the lean amine stream and the untreated gas in the contactor 327, produce the sweet gas to be discharged through the gas outlet 329, and rich amine stream 333 to be discharged through the liquid outlet 336.

In some implementations, the system 300 can further include a booster pump 326 that is disposed between the pressure exchanger 321 and the contactor 327. The booster pump 326 is configured to increase pressure of the high pressure lean amine stream 331 to provide lean amine liquid to the liquid inlet 335 of the contactor 327.

In some cases, the system 300 may include a pump 323 that is configured to directly or indirectly provide lean amine stream 330 to the pressure exchanger 321. For instance, in some implementations, as shown in FIG. 6, the system 300 includes the tank 322 connected to the pump 323 and configured to store lean amine liquid. The tank 322 may be located at an evaluated position relative to the pressure exchanger 321 and configured to feed the stored lean amine stream 330 to the pressure exchanger 321 by gravity. The tank 322 can supply continuous flow by gravity even in an unscheduled shutoff of the pump 323. In addition, the tank 322 can provide sufficient time to engage a control response for avoiding any introduction of stripped gas into the high pressure side of the pressure exchanger 321. Thus, the tank 322 located at the elevated level can help to avoid damage to the pressure exchanger 321 due to the air-hammer effect of the stripped gas.

The pressure exchanger 321 in FIG. 6 can have the same or similar structures of the pressure exchanger 100 or 200 described above with respect to FIGS. 4 and 5. For example, the pressure exchanger 321 includes a rotor (e.g., rotor 105 or 205) that is configured to rotate about an axis and defines a plurality of rotor ducts (e.g., rotor ducts 120 or 220) extending parallel to the axis. Each rotor duct extends between a first side and a second side of the rotor that are spaced apart from each other. The pressure exchanger 321 further includes a first end cover (e.g., end cover 115) that is disposed at the first side of the rotor and defines a first pair of apertures configured to communicate one or both of the first fluid and the second fluid, and a second end cover (e.g., end cover 114) that is disposed at the second side of the rotor and defines a second pair of apertures configured to communicate one or both of the first fluid and the second fluid.

The pressure exchanger 321 receives the low pressure lean amine stream 330 from the tank 322 and outputs the high pressure lean amine stream 331. In addition, the pressure exchanger 321 receives the high pressure rich amine stream 333 from the contactor 327, and outputs the low pressure rich amine stream 332. The rotation of the rotor of the pressure exchanger 321 enables the pressure exchange process between the lean amine and rich amine streams.

The flow management techniques described above with FIGS. 4 and 5 can be applied to the pressure exchanger 321 to avoid the air-hammer effect. For example, the rotor of the pressure exchanger 321 can be configured to rotate to allow a least a portion of the first fluid to contact the second end cover to thereby reduce or eliminate a dead volume including a mixture of the rich amine and the lean amine inside of the rotor. In addition, a flush volume of lean amine may be also provided to pass through one or more of the plurality of rotor ducts between one of the first pair of apertures and one of the second pair of apertures. In this way, stripped gas in the rotor does not return to the high pressure side (e.g., the lean amine stream 331 and the rich amine stream 333) of the pressure exchanger 321, and directly discharges to the low pressure rich amine stream 332.

The system 300 can further include the regenerator 325 configured to receive low pressure rich amine stream 332 discharged from the pressure exchanger 321. The regenerator 325 can collect or discharge the sour gas by heat, and supply lean amine to the tank 322 through the pump 323. The system 300 can further include a heat exchanger 324 configured to exchange heat between the rich amine stream 332 discharged from the pressure exchanger 321 and the lean amine stream discharged from the regenerator 325.

In some examples, the system 300 can further include a check valve 334 that is configured to provide the lean amine stream in one direction from the regenerator 325 to the tank 322 and to block the flow in the other direction. In some examples, the system 300 can further includes a let-down valve or a make-up pump to maintain constant levels in the regenerator 325 or flush tank to adjust any solvent volume imbalances between the high and low pressure sides of the pressure exchanger 321.

All examples described herein are merely to describe the present disclosure in greater detail. Therefore, it should be understood that the scope of the present disclosure is not limited to the example implementations described above or by the use of such terms unless limited by the appended claims. Also, it should be apparent to those skilled in the art that various alterations, substitutions, and modifications may be made within the scope of the appended claims or equivalents thereof.

What is claimed is:

1. A pressure exchanger comprising:
a rotor configured to rotate about an axis, the rotor defining a plurality of rotor ducts extending parallel to the axis, each rotor duct extending between a first side and a second side of the rotor that are spaced apart from each other;
a first end cover disposed at the first side of the rotor, the first end cover defining a first pair of apertures configured to communicate a first fluid having a first concentration; and
a second end cover disposed at the second side of the rotor, the second end cover defining a second pair of apertures configured to communicate a second fluid having a second concentration different from the first concentration,
wherein the rotor is configured to:
rotate relative to the first end cover and the second end cover,
based on communicating the first fluid and the second fluid through at least a portion of the plurality of rotor ducts, exchange pressure energy between the first fluid and the second fluid, and
provide a flush volume of the second fluid from the second end cover to the first end cover along the rotor ducts to thereby reduce or eliminate a dead volume comprising a mixture of the first fluid and the second fluid inside of the rotor, the flush volume of the second fluid passing through one or more of the plurality of rotor ducts from one of the second pair of apertures to one of the first pair of apertures and being discharged through a first portion of the one of the first pair of apertures while (i) the first fluid is in contact with central portions of both of the first and the second end covers disposed on the axis of the rotor, and (ii) the first fluid is discharged through a second portion of the one of the first pair of apertures,
wherein the second portion of the one of the first pair of apertures is located radially inward relative to the first portion of the one of the first pair of apertures, and
wherein an area of the second portion of the one of the first pair of apertures is greater than an area of the first portion of the one of the first pair of apertures.

2. The pressure exchanger of claim 1, wherein at least one of the rotor, the first end cover, or the second end cover is configured to change a rotation speed of the rotor to thereby control at least one of the dead volume or the flush volume.

3. The pressure exchanger of claim 2, wherein the rotor is configured to eliminate the dead volume based on a decrease of the rotation speed or an increase of a flow rate of the second fluid entering the rotor.

4. The pressure exchanger of claim 2, wherein the first pair of apertures comprise:
a high pressure inlet configured to introduce, to the rotor, the first fluid having a first high pressure; and
a low pressure outlet configured to discharge, from the rotor, the first fluid having a first low pressure less than the first high pressure, and
wherein the second pair of apertures comprise:
a low pressure inlet configured to introduce, to the rotor, the second fluid having a second low pressure, and
a high pressure outlet configured to discharge, from the rotor, the second fluid having a second high pressure greater than the second low pressure.

5. The pressure exchanger of claim 4, wherein the rotor is configured to rotate about the axis in a direction from the high pressure inlet to the low pressure outlet.

6. The pressure exchanger of claim 4, wherein the first end cover comprises a first sealing area that is disposed between the first pair of apertures and faces the first side of the rotor,
wherein the second end cover comprises a second sealing area that is disposed between the second pair of apertures and faces the second side of the rotor, and
wherein the rotor is configured to rotate to allow at least a portion of the first fluid to contact the second sealing area.

7. The pressure exchanger of claim 6, wherein the rotor is configured to rotate to allow an end portion of the flush volume to extend from the low pressure inlet to the low pressure outlet.

8. The pressure exchanger of claim 4, wherein a width of the low pressure inlet is greater than a width of the high pressure outlet, and
wherein a width of the low pressure outlet is greater than a width of the high pressure inlet.

9. A pressure exchanger comprising:
a rotor configured to rotate about an axis, the rotor defining a plurality of rotor ducts extending parallel to the axis, each rotor duct extending between a first side and a second side of the rotor that are spaced apart from each other;
a first end cover disposed at the first side of the rotor, the first end cover defining:
a first inlet configured to receive a first fluid having a first concentration, and
a second inlet configured to receive a second fluid having a second concentration different from the first concentration; and
a second end cover disposed at the second side of the rotor, the second end cover defining:
a first outlet that faces the second inlet and is configured to discharge the first fluid, and
a second outlet that faces the first inlet and is configured to discharge the second fluid,
wherein the rotor is configured to:
rotate relative to the first end cover and the second end cover,
based on communicating the first fluid and the second fluid through at least a portion of the plurality of rotor ducts, exchange pressure energy between the first fluid and the second fluid, and
provide a flush volume of the second fluid from the first end cover to the second end cover along the rotor ducts to thereby reduce or eliminate a dead volume comprising a mixture of the first fluid and the second fluid inside of the rotor, the flush volume of the second fluid passing through one or more of the plurality of rotor ducts from the second inlet of the first end cover to the first outlet of the second end cover and being discharged through a first portion of the first outlet of the second end cover while (i) the first fluid is in contact with central portions of both of the first and the second end covers disposed on the axis of the rotor and (ii) the flush volume of the second fluid is discharged through a second portion of the first outlet of the second end cover, wherein the second portion of the first outlet of the second end cover is located radially inward relative to the first portion of the first outlet of the second end cover, and
wherein an area of the second portion of the first outlet of the second end cover is greater than an area of the first portion of the first outlet of the second end cover.

10. The pressure exchanger of claim 9, wherein at least one of the rotor, the first end cover, or the second end cover is configured to change a rotation speed of the rotor to thereby control at least one of the dead volume or the flush volume.

11. The pressure exchanger of claim 10, wherein the rotor is configured to eliminate the dead volume based on a decrease of the rotation speed or an increase of a flow rate of the second fluid entering the rotor.

12. The pressure exchanger of claim 10, wherein the first inlet is a high pressure inlet configured to introduce, to the rotor, the first fluid having a first high pressure,
wherein the first outlet is a low pressure outlet configured to discharge, from the rotor, the first fluid having a first low pressure less than the first high pressure,
wherein the second inlet is a low pressure inlet configured to introduce, to the rotor, the second fluid having a second low pressure, and
wherein the second outlet is a high pressure outlet configured to discharge, from the rotor, the second fluid having a second high pressure greater than the second low pressure.

13. The pressure exchanger of claim 12, wherein the rotor is configured to rotate about the axis in a direction from the high pressure inlet to the low pressure inlet.

14. The pressure exchanger of claim 12, wherein the rotor is configured to rotate to allow an end portion of the flush volume to extend from the low pressure inlet to the low pressure outlet.

15. A system for gas processing, comprising:
a contactor that defines:
a gas inlet configured to receive untreated gas having a first toxic level,
a gas outlet configured to discharge treated gas having a second toxic level less than the first toxic level,
a liquid outlet configured to discharge a first fluid having a first concentration, and
a liquid inlet configured to receive a second fluid having a second concentration less than the first concentration, wherein the contactor is configured to generate the treated gas and the first fluid based on contact between the untreated gas and the second fluid;
a tank configured to store the second fluid and to discharge the second fluid; and
a pressure exchanger disposed between the tank and the contactor and configured to receive the first fluid from the contactor and the second fluid from the tank, the pressure exchanger comprising:
a rotor configured to rotate about an axis, the rotor defining a plurality of rotor ducts extending parallel to the axis, each rotor duct extending between a first side and a second side of the rotor that are spaced apart from each other,
a first end cover disposed at the first side of the rotor, the first end cover defining a first pair of apertures configured to communicate one or both of the first fluid and the second fluid, and
a second end cover disposed at the second side of the rotor, the second end cover defining a second pair of apertures configured to communicate one or both of the first fluid and the second fluid,
wherein the rotor is configured to:
rotate relative to the first end cover and the second end cover,
based on communicating the first fluid and the second fluid through at least a portion of the plurality of rotor ducts, exchange pressure between the first fluid and the second fluid, and
provide a flush volume of the second fluid from the second end cover to the first end cover along the rotor ducts to thereby reduce or eliminate a dead volume comprising a mixture of the first fluid and the second fluid inside of the rotor, the flush volume of the second fluid passing through one or more of the plurality of rotor ducts from one of the second pair of apertures to one of the first pair of apertures and being discharged through a first portion of the one of the first pair of apertures while (i) the first fluid is in contact with central portions of both of the first and the second end covers disposed on the axis of the rotor and (ii) the first fluid is discharged through a second portion of the one of the first pair of apertures,
wherein the second portion of the one of the first pair of apertures is located radially inward relative to the first portion of the one of the first pair of apertures, and
wherein an area of the second portion of the one of the first pair of apertures is greater than an area of the first portion of the one of the first pair of apertures.

16. The system of claim 15, further comprising:
a regenerator comprising a reservoir configured to receive the first fluid from the pressure exchanger, the regenerator being configured to generate the second fluid from the first fluid and supply the second fluid to the tank.

17. The system of claim 16, wherein the tank is disposed at a higher level relative to the pressure exchanger with respect to a ground.

18. The system of claim 17, further comprising a pump disposed between the regenerator and the tank and configured to supply the second fluid from the regenerator to the tank.

* * * * *